United States Patent
Liu

(10) Patent No.: US 8,964,413 B2
(45) Date of Patent: Feb. 24, 2015

(54) TWO STAGE RESONANT CONVERTER ENABLING SOFT-SWITCHING IN AN ISOLATED STAGE

(75) Inventor: Martin Liu, ShenZhen (CN)

(73) Assignee: Flextronics AP, LLC, Broomfield, CO (US)

(*) Notice: Subject to any disclaimer, the term of this patent is extended or adjusted under 35 U.S.C. 154(b) by 469 days.

(21) Appl. No.: 12/765,412

(22) Filed: Apr. 22, 2010

(65) Prior Publication Data

US 2011/0261590 A1   Oct. 27, 2011

(51) Int. Cl.
*H02M 3/335* (2006.01)
*H02M 1/42* (2007.01)
*H02M 3/337* (2006.01)
*H02M 1/00* (2006.01)

(52) U.S. Cl.
CPC .......... *H02M 1/4225* (2013.01); *H02M 3/3378* (2013.01); *Y02B 70/126* (2013.01); *Y02B 70/1433* (2013.01); *H02M 2001/0058* (2013.01); *Y02B 70/1491* (2013.01)
USPC .............................................. 363/17; 363/25

(58) Field of Classification Search
USPC ......... 363/21.02, 21.03, 21.04, 21.12, 17, 19, 363/22–26; 315/276, 225, 209 R
See application file for complete search history.

(56) References Cited

U.S. PATENT DOCUMENTS

| | | | |
|---|---|---|---|
| 4,051,425 A | 9/1977 | Smith | |
| 4,184,197 A * | 1/1980 | Cuk et al. .................. | 363/16 |
| 4,273,406 A | 6/1981 | Okagami | |
| 4,370,703 A | 1/1983 | Risberg | |
| 4,563,731 A | 1/1986 | Sato | |
| 4,645,278 A | 2/1987 | Yevak et al. | |
| 4,695,933 A | 9/1987 | Nguyen et al. | |
| 4,712,160 A | 12/1987 | Sato et al. | |
| 4,788,626 A | 11/1988 | Neidig et al. | |
| 4,806,110 A | 2/1989 | Lindeman | |
| 4,823,249 A * | 4/1989 | Garcia, II .................. | 363/48 |
| 4,841,220 A | 6/1989 | Tabisz et al. | |
| 4,857,822 A | 8/1989 | Tabisz et al. | |

(Continued)

FOREIGN PATENT DOCUMENTS

| JP | 4217869 A | 8/1992 |
|---|---|---|
| JP | 10243640 A | 9/1998 |

(Continued)

OTHER PUBLICATIONS

EE Times.com—"Team Claims Midrange Wireless Energy Transfer", by R. Colin Johnson, 4 pages, Nov. 20, 2006.

(Continued)

*Primary Examiner* — Emily P Pham
(74) *Attorney, Agent, or Firm* — Haverstock & Owens LLP

(57) ABSTRACT

A resonant converter comprising: a controllable current source; a resonant tank circuit coupled to the current source; and an isolated buck-type converter coupled to the resonant tank circuit, the isolated buck-type converter having an output, wherein the resonant tank circuit enables switches in the isolated buck-type converter to switch under soft-switching conditions. In some embodiments, the controllable current source is a switch-mode-type current source. In some embodiments, the isolated buck-type converter comprises a half-bridge converter. In some embodiments, the isolated buck-type converter comprises a full-bridge converter. In some embodiments, the isolated buck-type converter comprises a push-pull converter.

23 Claims, 13 Drawing Sheets

(56) References Cited

U.S. PATENT DOCUMENTS

| | | |
|---|---|---|
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Sway-Tin |
| 4,901,069 A | 2/1990 | Veneruso |
| 4,975,821 A | 12/1990 | Lethellier |
| 5,065,302 A | 11/1991 | Kanazawa |
| 5,090,919 A | 2/1992 | Tsuji |
| 5,101,322 A | 3/1992 | Ghaem et al. |
| 5,132,890 A | 7/1992 | Blandino |
| 5,164,657 A | 11/1992 | Gulczynski |
| 5,235,491 A | 8/1993 | Weiss |
| 5,262,932 A | 11/1993 | Stanley et al. |
| 5,295,044 A | 3/1994 | Araki et al. |
| 5,325,283 A | 6/1994 | Farrington |
| 5,365,403 A | 11/1994 | Vinciarelli et al. |
| 5,373,432 A | 12/1994 | Vollin |
| 5,438,294 A | 8/1995 | Smith |
| 5,442,540 A | 8/1995 | Hua |
| 5,490,052 A | 2/1996 | Yoshida et al. |
| 5,565,761 A | 10/1996 | Hwang |
| 5,565,781 A | 10/1996 | Dauge |
| 5,592,128 A | 1/1997 | Hwang |
| 5,673,185 A | 9/1997 | Albach et al. |
| 5,712,772 A | 1/1998 | Telefus et al. |
| 5,742,151 A | 4/1998 | Hwang |
| 5,747,977 A | 5/1998 | Hwang |
| 5,768,118 A | 6/1998 | Faulk et al. |
| 5,786,687 A | 7/1998 | Faulk |
| 5,786,992 A | 7/1998 | Vinciarelli et al. |
| 5,798,635 A | 8/1998 | Hwang et al. |
| 5,804,950 A | 9/1998 | Hwang et al. |
| 5,811,895 A | 9/1998 | Suzuki et al. |
| 5,818,207 A | 10/1998 | Hwang |
| 5,838,554 A | 11/1998 | Lanni |
| 5,859,771 A | 1/1999 | Kniegl |
| 5,870,294 A | 2/1999 | Cyr |
| 5,894,243 A | 4/1999 | Hwang |
| 5,903,138 A | 5/1999 | Hwang et al. |
| 5,905,369 A | 5/1999 | Ishii et al. |
| 5,923,543 A | 7/1999 | Choi |
| 5,949,672 A | 9/1999 | Bertnet |
| 6,009,008 A | 12/1999 | Pelly |
| 6,058,026 A | 5/2000 | Rozman |
| 6,069,803 A | 5/2000 | Cross |
| 6,091,233 A | 7/2000 | Hwang et al. |
| 6,091,611 A | 7/2000 | Lanni |
| 6,160,725 A | 12/2000 | Jansen |
| 6,183,302 B1 | 2/2001 | Daikuhara et al. |
| 6,191,957 B1 * | 2/2001 | Peterson ................. 363/17 |
| 6,272,015 B1 | 8/2001 | Mangtani |
| 6,282,092 B1 | 8/2001 | Okamoto et al. |
| 6,307,761 B1 | 10/2001 | Nakagawa |
| 6,323,627 B1 | 11/2001 | Schmiederer et al. |
| 6,326,740 B1 | 12/2001 | Chang et al. |
| 6,344,980 B1 | 2/2002 | Hwang et al. |
| 6,366,483 B1 | 4/2002 | Ma et al. |
| 6,385,059 B1 | 5/2002 | Telefus et al. |
| 6,388,897 B1 | 5/2002 | Ying |
| 6,390,854 B2 | 5/2002 | Yamamoto et al. |
| 6,396,277 B1 | 5/2002 | Fong et al. |
| 6,396,716 B1 * | 5/2002 | Liu et al. ................. 363/17 |
| 6,407,514 B1 | 6/2002 | Glaser et al. |
| 6,452,816 B2 | 9/2002 | Kuranuki |
| 6,459,175 B1 | 10/2002 | Potega |
| 6,469,914 B1 | 10/2002 | Hwang et al. |
| 6,469,980 B1 | 10/2002 | Takemura et al. |
| 6,483,281 B2 | 11/2002 | Hwang |
| 6,487,095 B1 | 11/2002 | Malik et al. |
| 6,531,854 B2 | 3/2003 | Hwang |
| 6,541,944 B2 | 4/2003 | Hwang |
| 6,549,409 B1 | 4/2003 | Saxelby, Jr. et al. |
| 6,583,999 B1 | 6/2003 | Spindler et al. |
| 6,605,930 B2 | 8/2003 | Hwang |
| 6,618,274 B2 * | 9/2003 | Boylan et al. ................. 363/17 |
| 6,650,552 B2 * | 11/2003 | Takagi et al. ................. 363/17 |
| 6,654,261 B2 * | 11/2003 | Welches et al. ................. 363/41 |
| 6,657,417 B1 | 12/2003 | Hwang |
| 6,671,189 B2 | 12/2003 | Jansen et al. |
| 6,674,272 B2 | 1/2004 | Hwang |
| 6,721,192 B1 | 4/2004 | Yang et al. |
| 6,775,162 B2 | 8/2004 | Mihai et al. |
| 6,894,461 B1 | 5/2005 | Hack et al. |
| 6,899,434 B2 * | 5/2005 | Morishita ................. 353/85 |
| 6,958,920 B2 | 10/2005 | Mednik et al. |
| 6,970,366 B2 | 11/2005 | Apeland et al. |
| 6,989,997 B2 | 1/2006 | Xu |
| 7,035,126 B1 | 4/2006 | Lanni |
| 7,038,406 B2 | 5/2006 | Wilson |
| 7,047,059 B2 | 5/2006 | Avrin et al. |
| 7,064,497 B1 | 6/2006 | Hsieh |
| 7,102,251 B2 | 9/2006 | West |
| 7,139,180 B1 | 11/2006 | Herbert |
| 7,208,833 B2 | 4/2007 | Nobori et al. |
| 7,212,420 B2 | 5/2007 | Liao |
| 7,235,932 B2 * | 6/2007 | Crandall et al. ................. 315/279 |
| 7,239,532 B1 | 7/2007 | Hsu et al. |
| 7,274,175 B2 | 9/2007 | Manolescu |
| 7,286,376 B2 | 10/2007 | Yang |
| 7,324,354 B2 | 1/2008 | Joshi et al. |
| 7,386,286 B2 | 6/2008 | Petrovic et al. |
| 7,450,388 B2 | 11/2008 | Beihoff et al. |
| 7,499,301 B2 | 3/2009 | Zhou |
| 7,545,256 B2 | 6/2009 | O'Toole et al. |
| 7,564,706 B1 | 7/2009 | Herbert |
| 7,570,497 B2 | 8/2009 | Jacques et al. |
| 7,596,007 B2 | 9/2009 | Phadke |
| 7,639,520 B1 | 12/2009 | Zansky et al. |
| 8,102,678 B2 | 1/2012 | Jungreis |
| 8,125,181 B2 | 2/2012 | Gregg et al. |
| 8,155,368 B2 | 4/2012 | Cheung et al. |
| 8,194,417 B2 * | 6/2012 | Chang ................. 363/16 |
| 8,213,666 B2 | 7/2012 | Groesch |
| 8,344,689 B2 | 1/2013 | Boguslavskij |
| 2002/0008963 A1 | 1/2002 | Dibene, II et al. |
| 2002/0011823 A1 | 1/2002 | Lee |
| 2002/0036200 A1 | 3/2002 | Ulrich |
| 2003/0035303 A1 | 2/2003 | Balakrishnan et al. |
| 2003/0112645 A1 * | 6/2003 | Schlecht ................. 363/89 |
| 2004/0062061 A1 | 4/2004 | Bourdillon |
| 2004/0183510 A1 | 9/2004 | Sutardja et al. |
| 2004/0228153 A1 | 11/2004 | Cao et al. |
| 2004/0252529 A1 | 12/2004 | Huber et al. |
| 2005/0024016 A1 | 2/2005 | Breen et al. |
| 2005/0036338 A1 | 2/2005 | Porter et al. |
| 2005/0105224 A1 | 5/2005 | Nishi |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2005/0270001 A1 | 12/2005 | Jitaru |
| 2005/0281425 A1 | 12/2005 | Greuet et al. |
| 2006/0002155 A1 | 1/2006 | Shteynberg et al. |
| 2006/0022637 A1 | 2/2006 | Wang et al. |
| 2006/0109696 A1 * | 5/2006 | Ren et al. ................. 363/81 |
| 2006/0152947 A1 | 7/2006 | Baker |
| 2006/0176719 A1 | 8/2006 | Uruno et al. |
| 2006/0213890 A1 | 9/2006 | Kooken et al. |
| 2006/0232220 A1 * | 10/2006 | Melis ................. 315/209 R |
| 2007/0007933 A1 | 1/2007 | Chan et al. |
| 2007/0040516 A1 | 2/2007 | Chen |
| 2007/0051712 A1 * | 3/2007 | Kooken et al. ................. 219/130.1 |
| 2007/0120542 A1 * | 5/2007 | LeMay ................. 323/229 |
| 2007/0138971 A1 | 6/2007 | Chen |
| 2007/0247091 A1 | 10/2007 | Maiocchi |
| 2007/0247877 A1 * | 10/2007 | Kwon et al. ................. 363/25 |
| 2007/0263415 A1 | 11/2007 | Jansen et al. |
| 2007/0287447 A1 | 12/2007 | Cornell |
| 2007/0298653 A1 | 12/2007 | Mahoney et al. |
| 2008/0018265 A1 * | 1/2008 | Lee et al. ................. 315/291 |
| 2008/0043496 A1 | 2/2008 | Yang |

(56) References Cited

U.S. PATENT DOCUMENTS

| | | | |
|---|---|---|---|
| 2008/0191667 A1 | 8/2008 | Kernahan et al. | |
| 2009/0034299 A1* | 2/2009 | Lev | 363/17 |
| 2009/0196073 A1* | 8/2009 | Nakahori | 363/17 |
| 2009/0231887 A1 | 9/2009 | Ye et al. | |
| 2009/0290384 A1 | 11/2009 | Jungreis | |
| 2009/0290385 A1 | 11/2009 | Jungreis et al. | |
| 2009/0300400 A1 | 12/2009 | DuBose | |
| 2010/0039833 A1 | 2/2010 | Coulson et al. | |
| 2010/0110732 A1 | 5/2010 | Moyer | |
| 2010/0289466 A1 | 11/2010 | Telefus | |
| 2010/0317216 A1 | 12/2010 | Pocrass | |
| 2010/0322441 A1 | 12/2010 | Weiss et al. | |
| 2013/0148385 A1 | 6/2013 | Zhang | |

FOREIGN PATENT DOCUMENTS

| | | |
|---|---|---|
| JP | 2000083374 A | 3/2000 |
| JP | 2000253648 A | 9/2000 |
| JP | 2004208357 A | 7/2004 |

OTHER PUBLICATIONS

EE Times.com—"Wireless Beacon Could Recharge Consumer Devices", by R. Colin Johnson, 3 pages, Jan. 11, 2007.

Hang-Seok Choi et al., Novel Zero-Voltage and Zero-Current-Switching (ZVZCS) Full-Bridge PWM Converter Using Coupled Output Inductor, Sep. 2002, IEEE, pp. 641-648.

"New Architectures for Radio Frequency dc/dc Power Conversion", Juan Rivas et al., Laboratory for Electromagnetic and Electronic Systems, Massachusetts Institute of Technology, Room 10-171 Cambridge, MA 02139, pp. 4074-4084, Jan. 2004.

Scollo, P. Fichera R., "Electronic Transformer for a 12V Halogen Lamp", Jan. 1999, ST Microelectronics pp. 1-4.

Notice of Allowance, mail date Sep. 17, 2010, U.S. Appl. No. 12/079,662, filed Mar. 27, 2008, Mark Telefus et al., 27 pages.

International Search Report and Written Opinion for the International Application No. PCT/US2011/033474, date of mailing Jul. 8, 2011, 9 pages.

International Search Report, PCT/US2011/49438, International filed Aug. 26, 2011, 10 pages.

\* cited by examiner

TWO STAGE RESONANT CONVERTER ENABLING SOFT-SWITCHING IN AN ISOLATED STAGE

FIELD OF THE INVENTION

The present invention relates to the field of converter topology. More particularly, the present invention relates to a two stage resonant DC/DC converter.

BACKGROUND OF THE INVENTION

In DC/DC converters, a DC input voltage is converted to a lower DC output voltage. Normally, the output voltage needs to be precisely regulated and input to output isolation is necessary in order to meet safety requirements.

FIG. 1 is a schematic diagram of a prior art two stage converter 100. The two stage converter 100 comprises a power factor correction (PFC) boost converter 120 and an isolated buck-type converter 140. The PFC boost converter 120 provides a high voltage DC current to the isolated buck-type converter 140. The isolated buck-type converter 140 converts the high voltage DC current into a low-voltage DC current.

In this and other prior art converters, the switches of the second stage work under hard switching conditions, resulting in high switching losses, and thereby affecting the total efficiency of the converter and limiting the switching frequency. Additionally, the second stage needs a current-limiting circuit to provide over-current protection during abnormal conditions, such as during an output short circuit. This need for over-current protection increases the complexity of the control circuit.

What is needed in the art is a simplified DC/DC converter design that reduces switching losses.

SUMMARY OF THE INVENTION

In one aspect of the present invention, a resonant converter comprises a controllable current source, a resonant tank circuit coupled to the current source, and an isolated buck-type converter coupled to the resonant tank circuit. The isolated buck-type converter has an output. The resonant tank circuit enables switches in the isolated buck-type converter to switch under soft-switching conditions.

In some embodiments, the controllable current source is a switch-mode-type current source. In some embodiments, the resonant converter further comprises a power factor correction (PFC) boost converter coupled to an input of the controllable current source, wherein the PFC boost converter is configured to provide a voltage to the input of the controllable current source. In some embodiments, the PFC boost converter is configured to provide a DC input voltage to the input of the controllable current source, and the isolated buck-type converter is configured to provide a DC output voltage to the output of the isolated buck-type converter. In some embodiments, the isolated buck-type converter comprises one of the group consisting of: a half-bridge converter, a full-bridge converter and a push-pull converter.

In some embodiments, the isolated buck-type converter includes a push-pull converter that comprises: a transformer having a first primary winding, a second primary winding, a first secondary winding, and a second secondary winding, wherein the controllable current source is coupled to a node between the first and second primary windings to form a primary center tap; a first primary switch coupled between the first primary winding and the controllable current source; and a second primary switch coupled between the second primary winding and the controllable current source.

In some embodiments, the push-pull converter further comprises a first secondary diode coupled between the first secondary winding and the output of the isolated buck-type converter, and a second secondary diode coupled between the second secondary winding and the output of the isolated buck-type converter.

In some embodiments, the push-pull converter further comprises a first primary inductor coupled between the first primary winding and the first primary switch, and a second primary inductor coupled between the second primary winding and the second primary switch.

In some embodiments, the push-pull converter further comprises a first secondary inductor coupled between the first secondary winding and the output of the isolated buck-type converter, and a second secondary inductor coupled between the second secondary winding and the output of the isolated buck-type converter.

In some embodiments, the push-pull converter further comprises a first secondary switch coupled between the first secondary winding and the output of the isolated buck-type converter, and a second secondary switch coupled between the second secondary winding and the output of the isolated buck-type converter.

In some embodiments, the isolated buck-type converter includes a full-bridge converter that comprises: a transformer having a first primary winding, a first secondary winding, and a second secondary winding; a first primary switch coupled between a first terminal of the first primary winding and the controllable current source; a second primary switch coupled between a second terminal of the first primary winding and the controllable current source; a third primary switch coupled between the first terminal of the first primary winding and the controllable current source, wherein the first primary switch and the third primary switch are coupled to the first terminal of the first primary winding through a common node; and a fourth primary switch coupled between the second terminal of the first primary winding and the controllable current source, wherein the second primary switch and the fourth primary switch are coupled to the second terminal of the first primary winding through a common node.

In some embodiments, the full-bridge converter further comprises a first secondary diode coupled between the first secondary winding and the output of the isolated buck-type converter, and a second secondary diode coupled between the second secondary winding and the output of the isolated buck-type converter.

In some embodiments, the full-bridge converter further comprises a primary inductor coupled between the first terminal of the first primary winding and the common node of the first primary switch and the third primary switch.

In some embodiments, the full-bridge converter further comprises a secondary inductor coupled between a common node between the first and second secondary windings and the output of the isolated buck-type converter.

In some embodiments, the full-bridge converter further comprises a first secondary switch coupled between the first secondary winding and the output of the isolated buck-type converter, and a second secondary switch coupled between the second secondary winding and the output of the isolated buck-type converter.

In some embodiments, the isolated buck-type converter includes a half-bridge converter that comprises: a transformer having a first primary winding, a first secondary winding, and a second secondary winding; a first primary switch coupled between a first terminal of the first primary winding and the controllable current source; a second primary switch coupled between the first terminal of the first primary winding and the controllable current source, wherein the first primary switch and the second primary switch are coupled to the first terminal of the first primary winding through a common node.

In some embodiments, the half-bridge converter further comprises a first secondary diode coupled between the first secondary winding and the output of the isolated buck-type converter, and a second secondary diode coupled between the second secondary winding and the output of the isolated buck-type converter.

In some embodiments, the half-bridge converter further comprises a primary inductor coupled between the first terminal of the first primary winding and the common node of the first primary switch and the second primary switch.

In some embodiments, the half-bridge converter further comprises a secondary inductor coupled between a common node between the first and second secondary windings and the output of the isolated buck-type converter.

In some embodiments, the half-bridge converter further comprises a first secondary switch coupled between the first secondary winding and the output of the isolated buck-type converter, and a second secondary switch coupled between the second secondary winding and the output of the isolated buck-type converter.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles herein can be applied to other embodiments. Thus, the present invention is not intended to be limited to the embodiment shown, but is to be accorded the widest scope consistent with the principles and features described herein.

Figure 1:
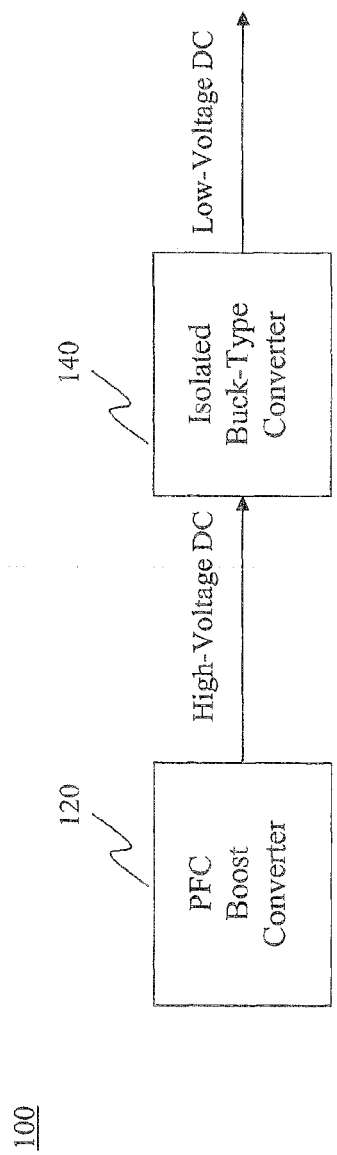
FIG. 1 is a schematic diagram of a prior art two stage converter.
Figure 2:
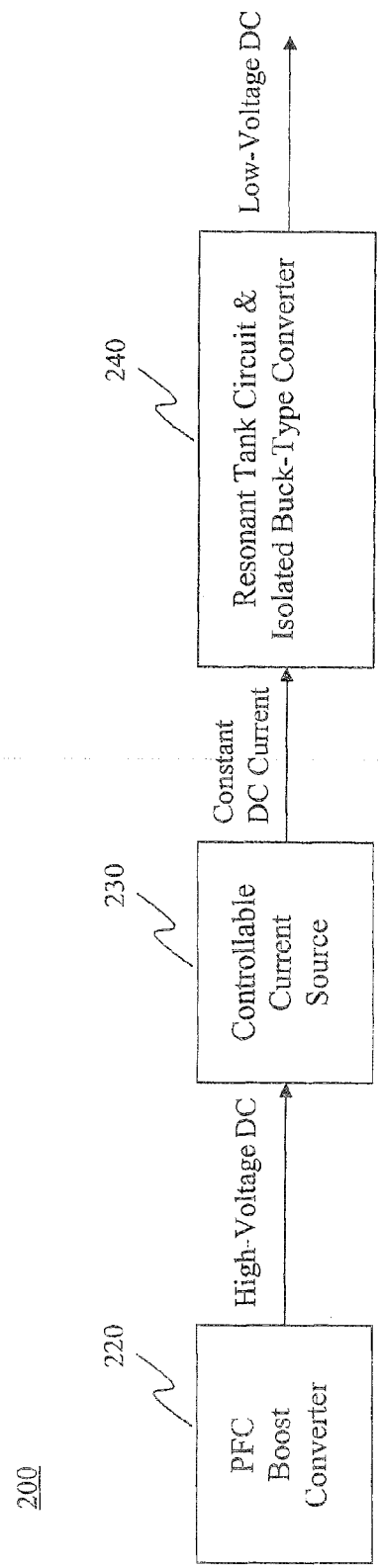
FIG. 2 is a schematic diagram of one embodiment of a two stage resonant converter in accordance with the principles of the present invention.

FIG. 2 is a schematic diagram of one embodiment of a two stage resonant converter 200 in accordance with the principles of the present invention. The two stage resonant converter 200 comprises a power factor correction (PFC) boost converter 220 coupled to an input of a controllable current source 230, which is coupled to a resonant tank circuit and isolated buck-type converter 240. The PFC boost converter 220 provides a high voltage DC current to the controllable current source 230. The controllable current source 230 provides a constant DC current to the resonant tank circuit and isolated buck-type converter 240, which converts the constant DC current into a low-voltage DC current. The isolated buck-type converter 240 provides this low-voltage DC current to its output. In some embodiments, the controllable current source 230 is a switch-mode-type current source. In some embodiments, the isolated buck-type converter 240 comprises one of the group consisting of a half-bridge converter, a full-bridge converter, and a push-pull converter.

Figure 3:
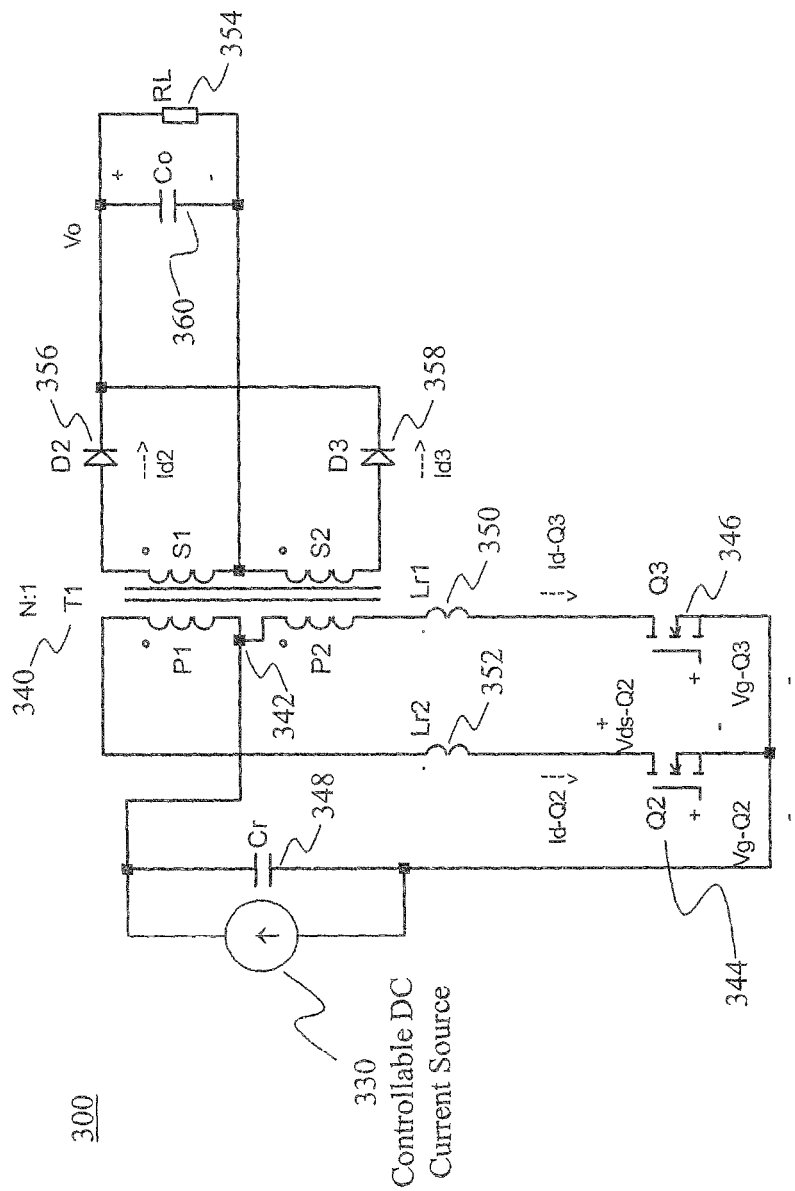
FIG. 3 is a schematic diagram of one embodiment of a two stage resonant converter employing a push-pull converter in accordance with the principles of the present invention.

FIG. 3 is a schematic diagram of one embodiment of a two stage resonant converter 300 employing a push-pull converter in accordance with the principles of the present invention. The two stage resonant converter 300 comprises a controllable DC current source 330 and a transformer 340. The transformer comprises a first primary winding P1, a second primary winding P2, a first secondary winding S1, and a second secondary winding S2. The controllable current source 330 is coupled to a node 342 between the first and second primary windings P1, P2 to form a primary center tap. A first primary switch 344 is coupled between the first primary winding P1 and the controllable current source 330. A second primary switch 346 is coupled between the second primary winding P2 and the controllable current source 330.

In some embodiments, a first secondary diode 356 is coupled between the first secondary winding S1 and the output of the isolated buck-type converter, and a second secondary diode 358 is coupled between the second secondary winding S2 and the output of the isolated buck-type converter. In some embodiments, the output of the isolated buck-type converter is coupled to a load resistor 354. In some embodiments, an output capacitor 360 is coupled in parallel between the transformer 340 and the output of the isolated buck-type converter. In some embodiments, a first primary inductor 352 is coupled between the first primary winding P1 and the first primary switch 344, and a second primary inductor 350 is coupled between the second primary winding P2 and the second primary switch 346. In some embodiments, a resonant capacitor 348 is coupled in parallel between the controllable DC current source 330 and the transformer 340. Together with the first primary inductor 352 and the second primary inductor 350, resonant capacitor 348 forms a resonant tank circuit.

Figure 4A:
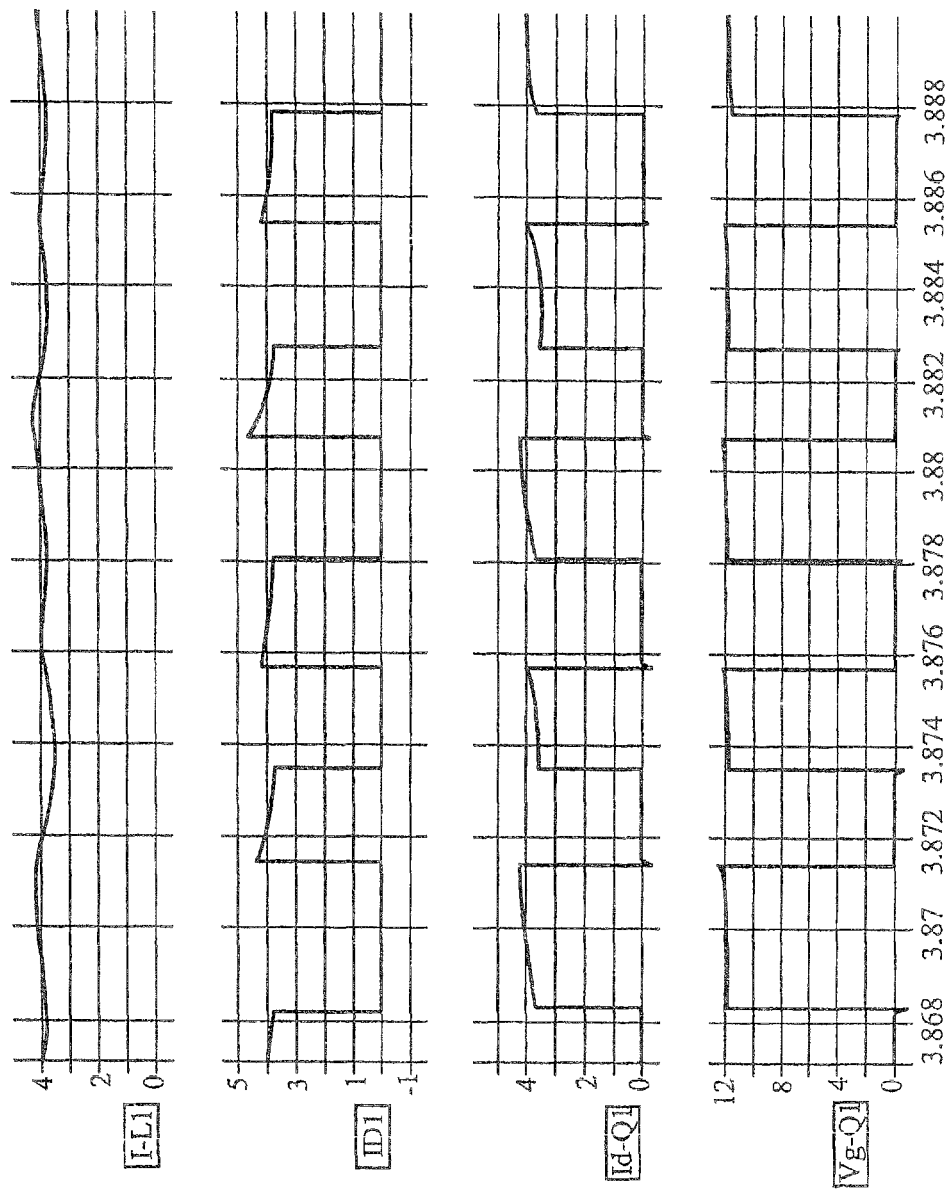
FIG. 4A is a waveform diagram of one embodiment of the first stage of a two stage resonant converter in accordance with the principles of the present invention.
Figure 4B:
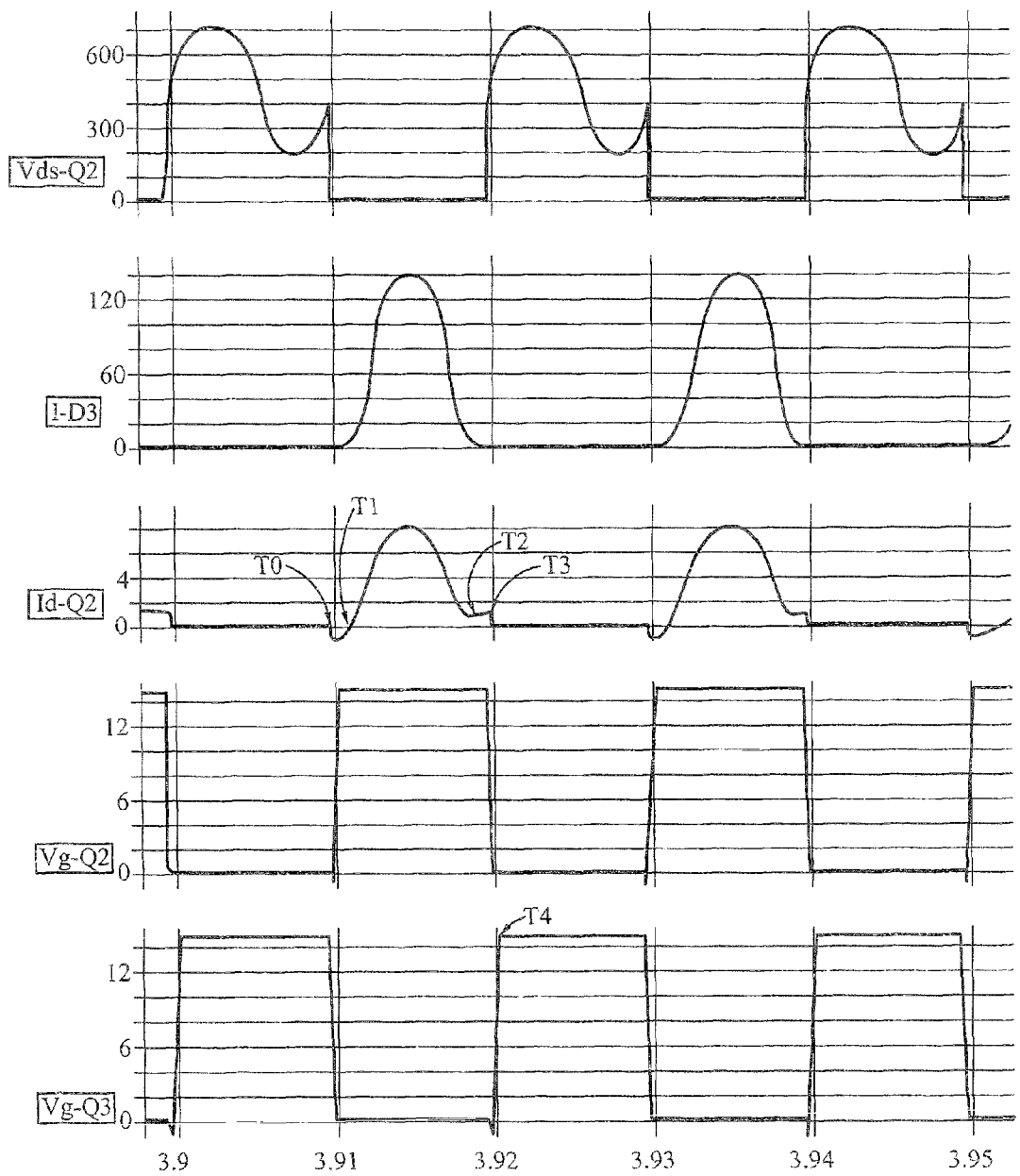
FIG. 4B is a waveform diagram of one embodiment of the second stage of a two stage resonant converter in accordance with the principles of the present invention.

FIG. 4A illustrates a waveform diagram of one embodiment of the first stage of a two stage resonant converter in accordance with the principles of the present invention. FIG. 4B illustrates a waveform diagram of one embodiment of the second stage of the two stage resonant converter in accordance with the principles of the present invention. For the purposes of discussing FIGS. 4A-B, an example is provided using the two stage resonant converter 300 of FIG. 3 with the controllable DC current source 1300 of FIG. 13, which will be discussed in further detail below.

In FIG. 4A, the signals from bottom to top are: the gate drive of switch 1340 (Vg-Q1), the drain current of switch 1340 (Id-Q1), the current of diode 1330 (ID1), and the current of inductor 1350 (I-L1). When switch 1340 (Q1) is turned on, the input voltage Vin is applied to first stage diode 1330 (D1) and first stage diode 1330 (D1) turns off. First stage switch 1340 (Q1) conducts the inductor current. In this period of time, energy is transferred from input power source 1310 (Vin) to the second stage and stored in the first stage inductor 1350 (L1) in the mean time. After first stage switch 1340 (Q1) turns off, first stage diode 1330 (D1) conducts the inductor current, and the stored inductor energy keeps transferring to the second stage.

In FIG. 4B, the signals from bottom to top are: the gate drive of switch 346 (Vg-Q3), the gate drive of switch 344 (Vg-Q2), the drain current of switch 344 (Id-Q2), the current of diode 358 (I-D3), and the drain to source voltage of switch 344 (Vds-Q2). At time point T0, switch 344 (Q2) turns on and switch 346 (Q3) is off. Diode 358 (D3) and diode 356 (D2) are both off, so the transformer secondary side is open. The current in the primary side of the transformer is the magnetizing current, and it flows through switch 344 (Q2), first primary inductor 352 (Lr2) and first primary winding P1, and discharges the output capacitance of MOSFET switch 344 (Q2). At the turn on point, the drain current of switch 344 (Id-Q2) flows through the MOSFET body diode, and the voltage across switch 344 (Vds-Q2) is approximately zero, making switch 344 (Q2) turn on at ZVS (zero voltage switching) condition. The turn on loss of MOSFET switch 344 (Q2) is low. At time point T1, the drain current of switch 344 (Id-Q2) reaches zero, the body diode of MOSFET switch 344 (Q2) turns off with zero current switching, and the current changes direction and shifts to the positive path (drain to source) of MOSFET switch 344 (Q2).

From T1 on, diode 358 (D3) turns on and begins to conduct current. The voltage of transformer secondary winding S2 is clamped to Vo. Accordingly, the voltage of transformer primary winding P1 is clamped to N*Vo, with N being the turns ratio of primary winding to secondary winding. Resonant capacitor 348 (Cr) is resonant with first primary inductor 352 (Lr2), and the drain current of switch 344 (Id-Q2) increases from zero. Current Id-Q2 can be divided into two portions, the resonant portion, which equals Id3/N and transfers to the secondary side though the transformer, and the magnetizing portion. At T2 point, the resonant portion reduces to zero. Accordingly the secondary diode 358 (D3) turns off at ZCS (zero current switching condition) condition, and the switching loss is reduced. From T2 to T3, diode current is zero, so the transformer secondary side is "open." On the primary side, only the magnetizing current is remaining.

At T3, switch 344 (Q2) is turned off by the drive signal. This is a near ZCS turn off because only a small magnetizing current flow through switch 344 (Q2). T3 to T4 is a "dead time", during which both switch 344 (Q2) and switch 346 (Q3) are off. On the primary side of the transformer, the magnetizing current consists of two parts: (1) the drain current of switch 344 (Id-Q2), which flows from Q2's drain to source and charges the output capacitance of switch 344 (Q2); and (2) the drain current of switch 346 (Id-Q3), which flows from Q3's source to drain and discharges the output capacitance of switch 346 (Q3). At time point T4, the drain current of switch 344 (Id-Q2) has reduced to zero and all the magnetizing current has flown through the body diode of MOSFET switch 346 (Q3). Switch 346 (Q3) turns on by the drive signal at ZVS condition. The next half cycle will repeat the similar work mechanism.

Figure 5:
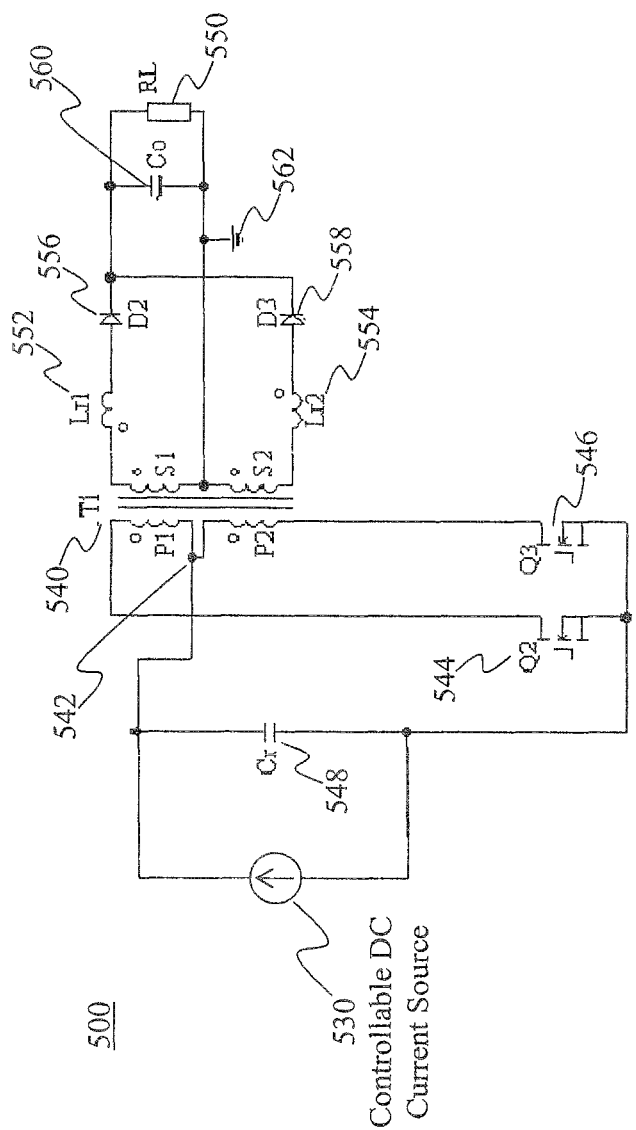
FIG. 5 is a schematic diagram of another embodiment of a two stage resonant converter employing a push-pull converter in accordance with the principles of the present invention.

FIG. 5 is a schematic diagram of another embodiment of a two stage resonant converter 500 employing a push-pull converter in accordance with the principles of the present invention. The two stage resonant converter 500 comprises a controllable DC current source 530 and a transformer 540. The transformer 540 comprises a first primary winding P1, a second primary winding P2, a first secondary winding S1, and a second secondary winding S2. The controllable current source 530 is coupled to a node 542 between the first and second primary windings P1, P2 to form a primary center tap. A first primary switch 544 is coupled between the first primary winding P1 and the controllable current source 530, and a second primary switch 546 is coupled between the second primary winding P2 and the controllable current source 530.

In some embodiments, a first secondary diode 556 is coupled between the first secondary winding S1 and the output of the isolated buck-type converter, and a second secondary diode 558 is coupled between the second secondary winding S2 and the output of the isolated buck-type converter. In some embodiments, a first secondary inductor 552 is coupled between the first secondary winding S1 and the output of the isolated buck-type converter, and a second secondary inductor 554 is coupled between the second secondary winding S2 and the output of the isolated buck-type converter. In some embodiments, a resonant capacitor 548 is coupled in parallel between the controllable DC current source 530 and the transformer 540. Together with the first secondary inductor 552 and the second secondary inductor 554, resonant capacitor 548 forms a resonant tank circuit. In some embodiments, the output of the isolated buck-type converter is coupled to a load resistor 550. In some embodiments, an output capacitor 560 is coupled in parallel between the transformer 540 and the output of the isolated buck-type converter. In some embodiments, a ground terminal 562 is coupled between the transformer 540 and the output of the isolated buck-type converter.

Figure 6:
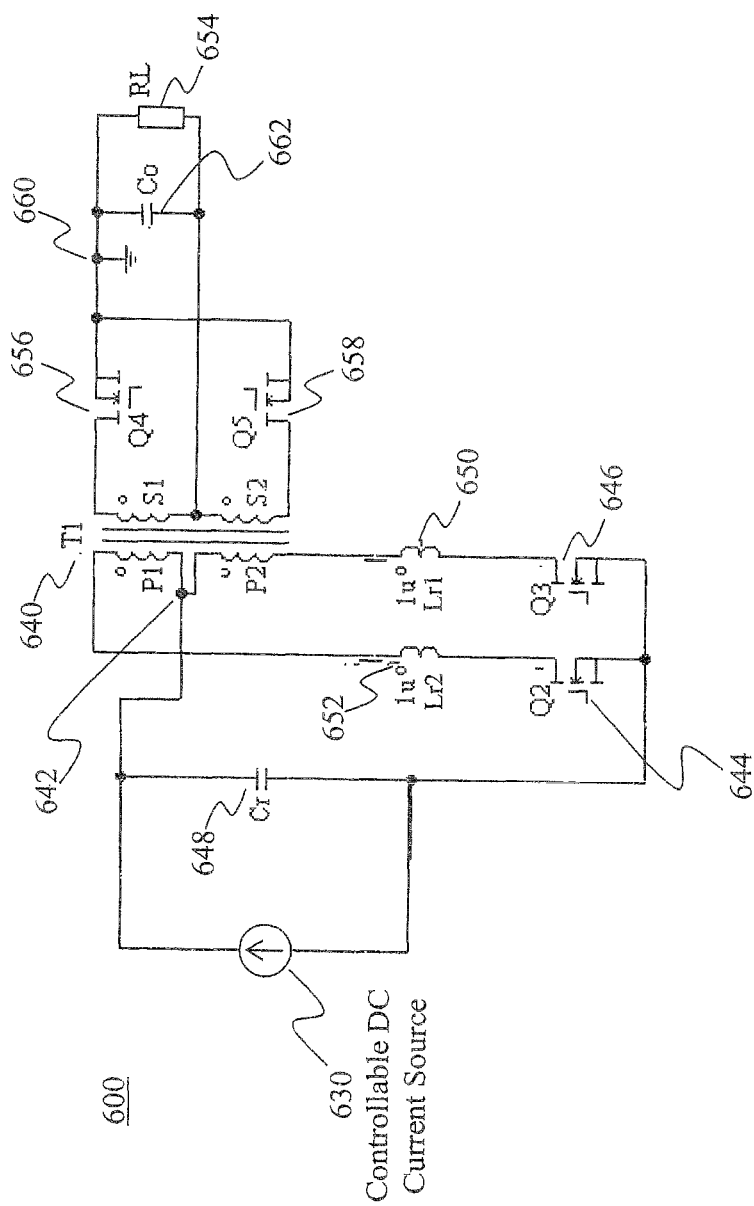
FIG. 6 is a schematic diagram of yet another embodiment of a two stage resonant converter employing a push-pull converter in accordance with the principles of the present invention.

FIG. 6 is a schematic diagram of yet another embodiment of a two stage resonant converter 600 employing a push-pull converter in accordance with the principles of the present invention. The two stage resonant converter 600 comprises a controllable DC current source 630 and a transformer 640. The transformer 640 comprises a first primary winding P1, a second primary winding P2, a first secondary winding S1, and a second secondary winding S2. The controllable current source 630 is coupled to a node 642 between the first and second primary windings P1, P2 to form a primary center tap. A first primary switch 644 is coupled between the first primary winding P1 and the controllable current source 630, and a second primary switch 646 is coupled between the second primary winding P2 and the controllable current source 630.

In some embodiments, a first primary inductor 652 is coupled between the first primary winding P1 and the first primary switch 644, and a second primary inductor 650 is coupled between the second primary winding P2 and the second primary switch 646. In some embodiments, a resonant capacitor 648 is coupled in parallel between the controllable DC current source 630 and the transformer 640. Together with the first primary inductor 652 and the second primary inductor 650, resonant capacitor 648 forms a resonant tank circuit. In some embodiments, a first secondary switch 658 is coupled between the first secondary winding S1 and the output of the isolated buck-type converter, and a second secondary switch 660 is coupled between the second secondary winding S2 and the output of the isolated buck-type converter. In some embodiments, the output of the isolated buck-type converter is coupled to a load resistor 654. In some embodiments, an output capacitor 664 is coupled in parallel between the transformer 640 and the output of the isolated buck-type converter. In some embodiments, a ground terminal 662 is coupled between the transformer 640 and the output of the isolated buck-type converter.

Figure 7:
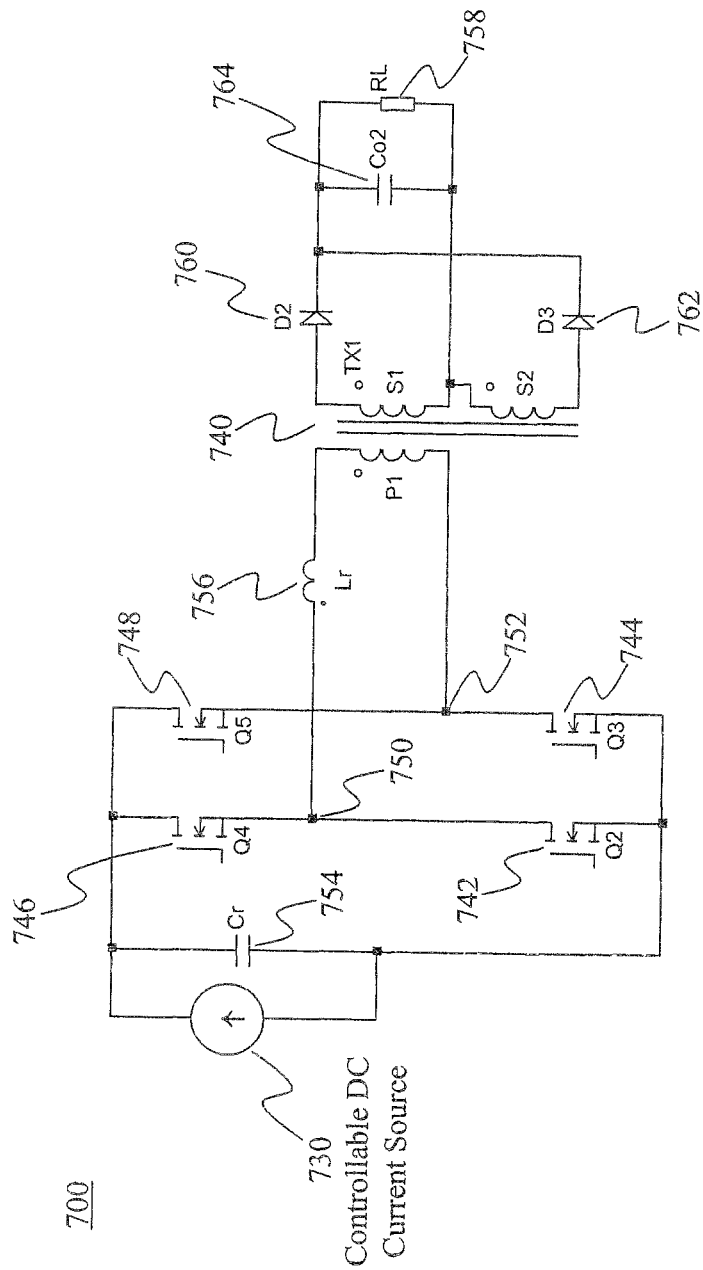
FIG. 7 is a schematic diagram of one embodiment of a two stage resonant converter employing a full-bridge converter in accordance with the principles of the present invention.

FIG. 7 is a schematic diagram of one embodiment of a two stage resonant converter 700 employing a full-bridge converter in accordance with the principles of the present invention.

The two stage resonant converter 700 comprises a controllable DC current source 730 and a transformer 740. The transformer 740 comprises a first primary winding P1, a first secondary winding S1, and a second secondary winding S2. A first primary switch 742 is coupled between a first terminal of the first primary winding P1 and the controllable current source 730. A second primary switch 744 is coupled between a second terminal of the first primary winding P1 and the controllable current source 730. A third primary switch 746 is coupled between the first terminal of the first primary winding P1 and the controllable current source 730. A fourth primary switch 748 is coupled between the second terminal of the first primary winding P1 and the controllable current source 730. The first primary switch 742 and the third primary switch 746 are coupled to the first terminal of the first primary winding P1 through a common node 750. The second primary switch 744 and the fourth primary switch 748 are coupled to the second terminal of the first primary winding P1 through a common node 752.

In some embodiments, a first secondary diode 760 coupled between the first secondary winding S1 and the output of the isolated buck-type converter, and a second secondary diode 762 is coupled between the second secondary winding S2 and the output of the isolated buck-type converter. In some embodiments, the output of the isolated buck-type converter is coupled to a load resistor 758. In some embodiments, an output capacitor 764 is coupled in parallel between the transformer 740 and the output of the isolated buck-type converter. In some embodiments, a primary inductor 756 is coupled between the first terminal of the first primary winding P1 and the common node 750 of the first primary switch 742 and the third primary switch 746. In some embodiments, a resonant capacitor 754 is coupled in parallel between the controllable DC current source 730 and the transformer 740. Together with the primary inductor 756, resonant capacitor 754 forms a resonant tank circuit.

Figure 8:
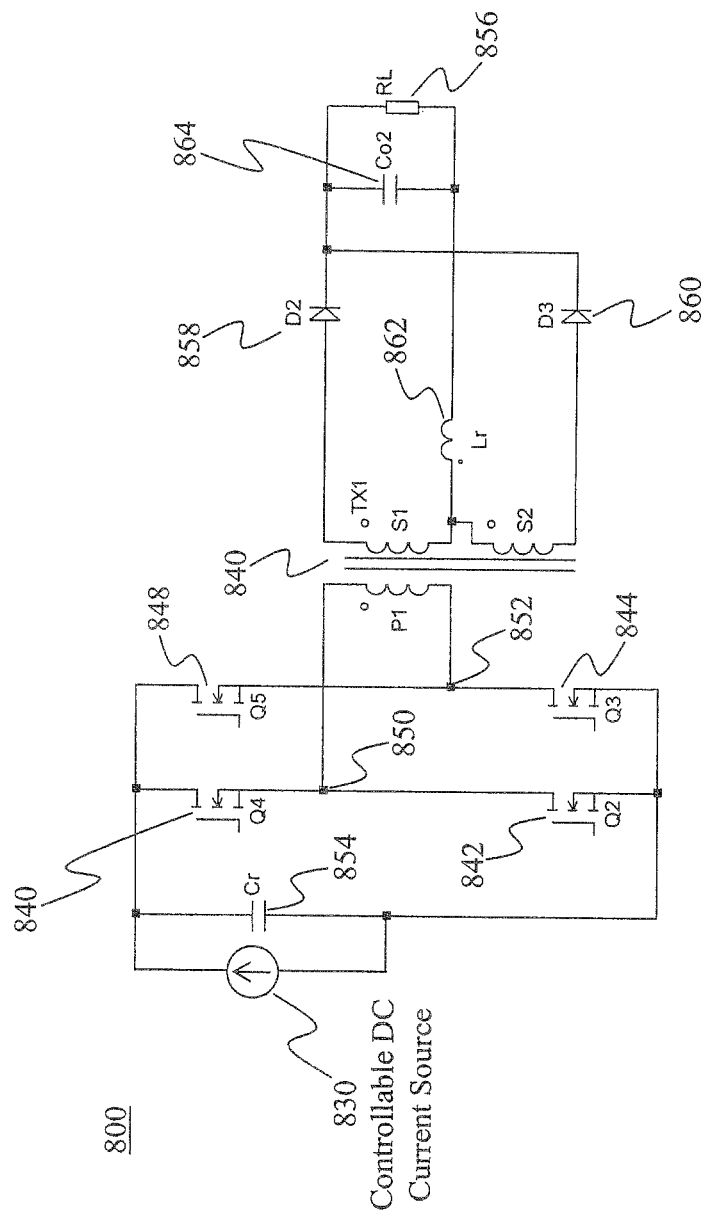
FIG. 8 is a schematic diagram of another embodiment of a two stage resonant converter employing a full-bridge converter in accordance with the principles of the present invention.

FIG. 8 is a schematic diagram of another embodiment of a two stage resonant converter 800 employing a full-bridge converter in accordance with the principles of the present invention. The two stage resonant converter 800 comprises a controllable DC current source 830 and a transformer 840. The transformer 840 comprises a first primary winding P1, a first secondary winding S1, and a second secondary winding S2. A first primary switch 842 is coupled between a first terminal of the first primary winding P1 and the controllable current source 830. A second primary switch 844 is coupled between a second terminal of the first primary winding P1 and the controllable current source 830. A third primary switch 840 is coupled between the first terminal of the first primary winding P1 and the controllable current source 830. A fourth primary switch 848 is coupled between the second terminal of the first primary winding P1 and the controllable current source 830. The first primary switch 842 and the third primary switch 840 are coupled to the first terminal of the first primary winding P1 through a common node 850. The second primary switch 844 and the fourth primary switch 848 are coupled to the second terminal of the first primary winding P1 through a common node 852.

In some embodiments, a first secondary diode 858 is coupled between the first secondary winding S1 and the output of the isolated buck-type converter, and a second secondary diode 860 is coupled between the second secondary winding S2 and the output of the isolated buck-type converter. In some embodiments, a secondary inductor 862 is coupled between a common node, between the second terminal of the first secondary winding S1 and first terminal of the second secondary winding S2, and the output of the isolated buck-type converter. In some embodiments, the output of the isolated buck-type converter is coupled to a load resistor 856. In some embodiments, an output capacitor 864 is coupled in parallel between the transformer 840 and the output of the isolated buck-type converter. In some embodiments, a resonant capacitor 854 is coupled in parallel between the controllable DC current source 830 and the transformer 840. Together with the secondary inductor 862, resonant capacitor 854 forms a resonant tank circuit.

Figure 9:
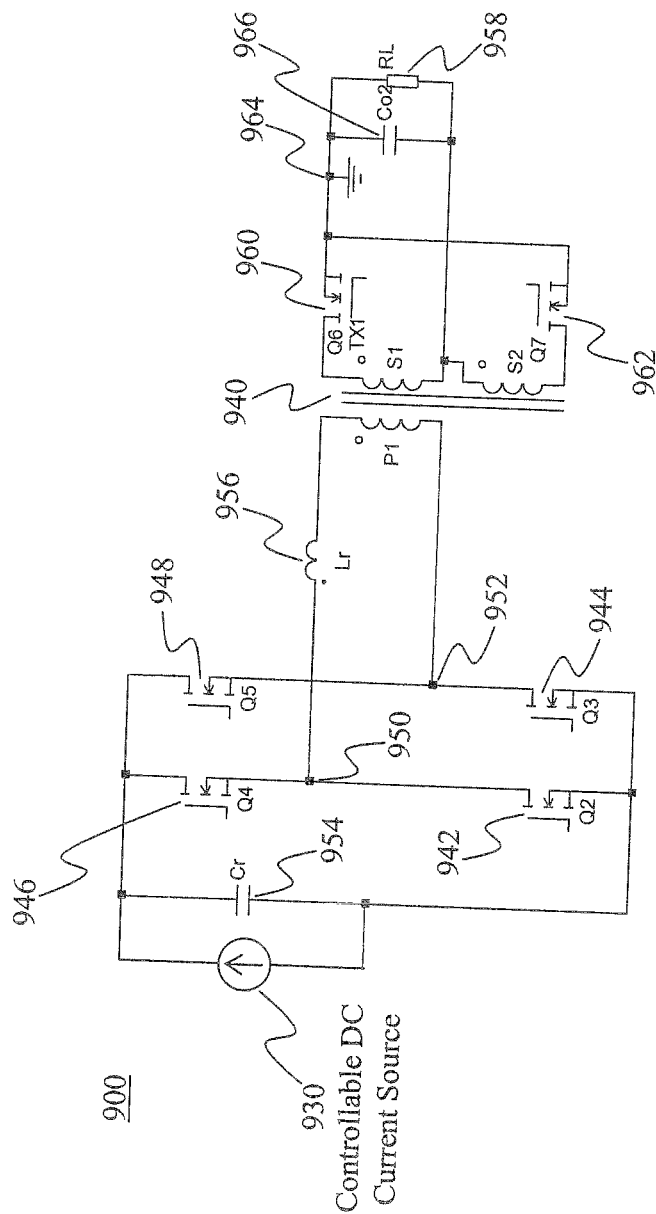
FIG. 9 is a schematic diagram of yet another embodiment of a two stage resonant converter employing a full-bridge converter in accordance with the principles of the present invention.

FIG. 9 is a schematic diagram of yet another embodiment of a two stage resonant converter 900 employing a full-bridge converter in accordance with the principles of the present invention. The two stage resonant converter 900 comprises a controllable DC current source 930 and a transformer 940. The transformer 940 comprises a first primary winding P1, a first secondary winding S1, and a second secondary winding S2. A first primary switch 942 is coupled between a first terminal of the first primary winding P1 and the controllable current source 930. A second primary switch 944 is coupled between a second terminal of the first primary winding P1 and the controllable current source 930. A third primary switch 946 is coupled between the first terminal of the first primary winding P1 and the controllable current source 930. A fourth primary switch 948 is coupled between the second terminal of the first primary winding P1 and the controllable current source 930. The first primary switch 942 and the third primary switch 946 are coupled to the first terminal of the first primary winding P1 through a common node 950. The second primary switch 944 and the fourth primary switch 948 are coupled to the second terminal of the first primary winding P1 through a common node 952.

In some embodiments, a primary inductor 956 is coupled between the first terminal of the first primary winding P1 and the common node 950 of the first primary switch 942 and the third primary switch 946. In some embodiments, a resonant capacitor 954 is coupled between the controllable DC current source 930 and the transformer 940. Together with the primary inductor 956, resonant capacitor 954 forms a resonant tank circuit. In some embodiments, a first secondary switch 960 is coupled between the first secondary winding S1 and the output of the isolated buck-type converter, and a second secondary switch 962 is coupled between the second secondary winding S2 and the output of the isolated buck-type converter. In some embodiments, the output of the isolated buck-type converter is coupled to a load resistor 958. In some embodiments, an output capacitor 968 is coupled in parallel between the transformer 940 and the output of the isolated buck-type converter. In some embodiments, a ground terminal 964 is coupled between the transformer 940 and the output of the isolated buck-type converter.

Figure 10:
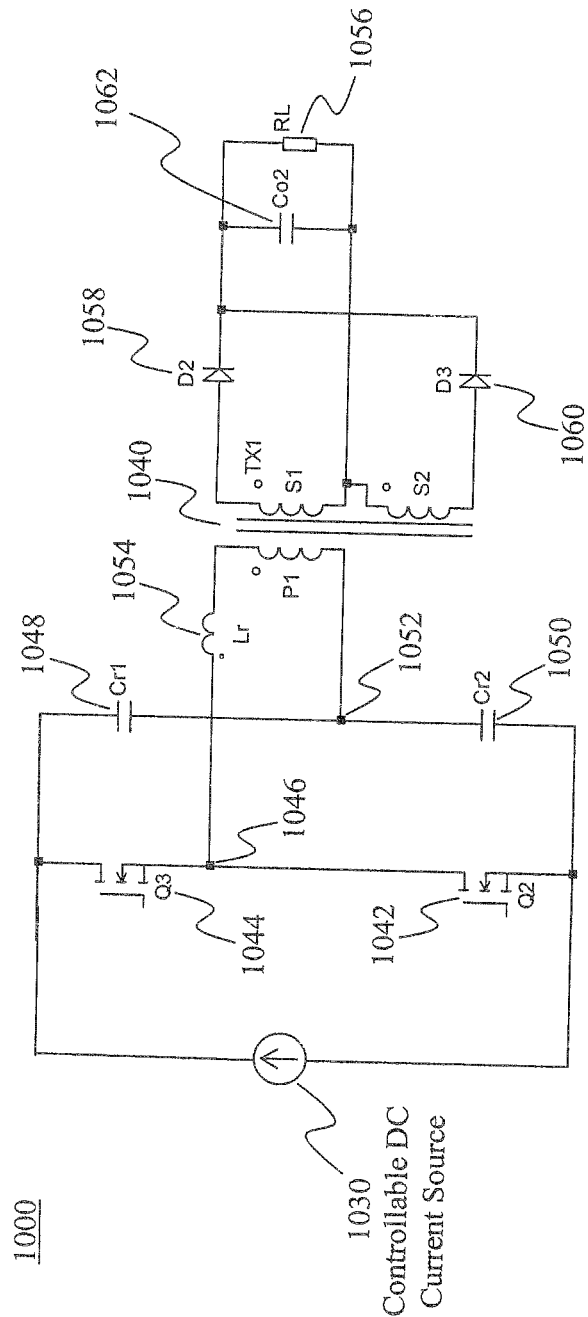
FIG. 10 is a schematic diagram of one embodiment of a two stage resonant converter employing a half-bridge converter in accordance with the principles of the present invention.

FIG. 10 is a schematic diagram of one embodiment of a two stage resonant converter 1000 employing a half-bridge converter in accordance with the principles of the present invention. The two stage resonant converter 1000 comprises a controllable DC current source 1030 and a transformer 1040. The transformer 1040 comprises a first primary winding P1, a first secondary winding S1, and a second secondary winding S2. A first primary switch 1042 is coupled between a first terminal of the first primary winding P1 and the controllable current source 1030. A second primary switch 1044 is coupled between the first terminal of the first primary winding P1 and the controllable current source 1030. The first primary switch 1042 and the second primary switch 1044 are coupled to the first terminal of the first primary winding P1 through a common node 1046.

In some embodiments, a first secondary diode 1058 is coupled between the first secondary winding S1 and the output of the isolated buck-type converter, and a second secondary diode 1060 is coupled between the second secondary winding S2 and the output of the isolated buck-type converter. In some embodiments, the output of the isolated buck-type converter is coupled to a load resistor 1056. In some embodiments, an output capacitor 1062 is coupled in parallel between the transformer 1040 and the output of the isolated buck-type converter. In some embodiments, a primary inductor 1054 is coupled between the first terminal of the first primary winding P1 and the common node 1046 of the first primary switch 1042 and the second primary switch 1044. In some embodiments, a first resonant capacitor 1048 and a second resonant capacitor 1050 are coupled between the controllable DC current source 1030 and the transformer 1040. In some embodiments, first resonant capacitor 1048 and second resonant capacitor 1050 are coupled to the second terminal of the first primary winding P1 through a common node 1052. Together with the primary inductor 1054, first resonant capacitor 1048 and second resonant capacitor 1050 form a resonant tank circuit.

Figure 11:
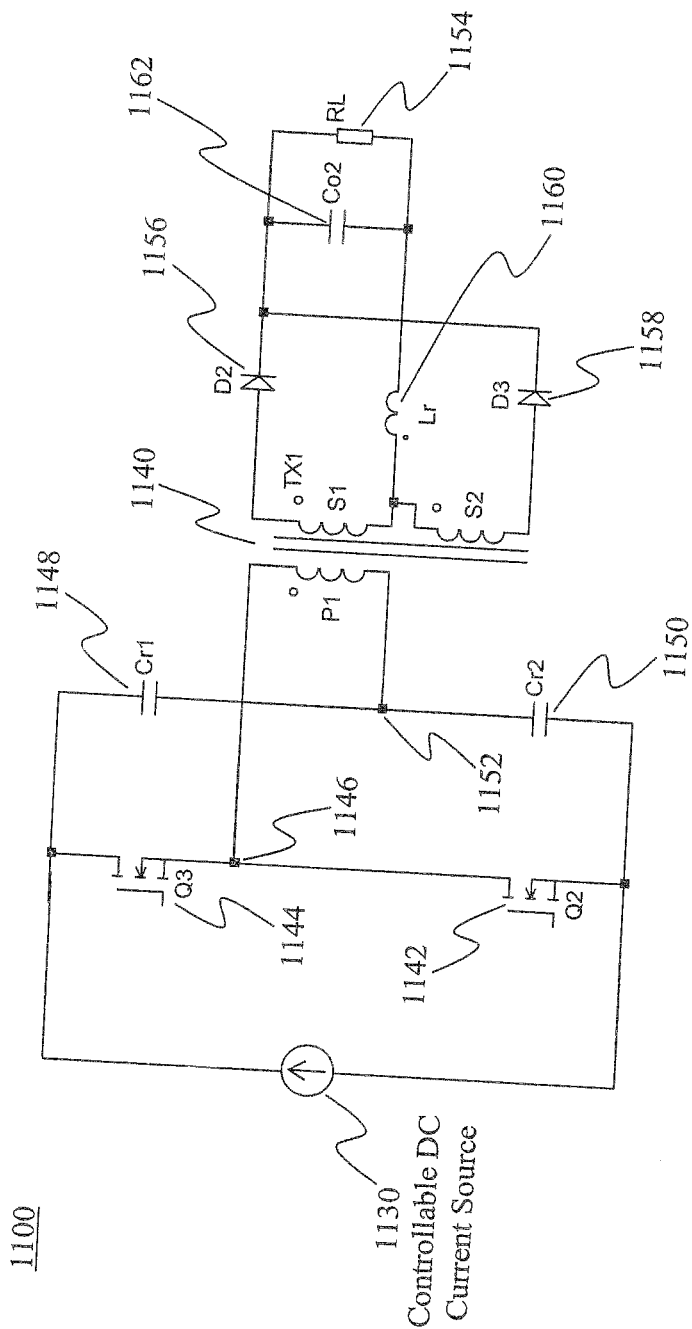
FIG. 11 is a schematic diagram of another embodiment of a two stage resonant converter employing a half-bridge converter in accordance with the principles of the present invention.

FIG. 11 is a schematic diagram of another embodiment of a two stage resonant converter 1100 employing a half-bridge converter in accordance with the principles of the present invention. The two stage resonant converter 1100 comprises a controllable DC current source 1130 and a transformer 1140. The transformer 1140 comprises a first primary winding P1, a first secondary winding S1, and a second secondary winding S2. A first primary switch 1142 is coupled between a first terminal of the first primary winding P1 and the controllable current source 1130. A second primary switch 1144 is coupled between the first terminal of the first primary winding P1 and the controllable current source 1130. The first primary switch 1142 and the second primary switch 1144 are coupled to the first terminal of the first primary winding P1 through a common node 1146.

In some embodiments, a first secondary diode 1156 is coupled between the first secondary winding S1 and the output of the isolated buck-type converter, and a second secondary diode 1158 is coupled between the second secondary winding S2 and the output of the isolated buck-type converter. In some embodiments, the output of the isolated buck-type converter is coupled to a load resistor 1154. In some embodiments, an output capacitor 1162 is coupled in parallel between the transformer 1140 and the output of the isolated buck-type converter. In some embodiments, a second inductor 1160 is coupled between a common node of the first and second secondary windings S1, S2 and the output of the isolated buck-type converter. In some embodiments, a first resonant capacitor 1148 and a second resonant capacitor 1150 are coupled between the controllable DC current source 1130 and the transformer 1140. In some embodiments, first resonant capacitor 1148 and second resonant capacitor 1150 are coupled to the second terminal of the first primary winding P1 through a common node 1152. Together with the secondary inductor 1160, first resonant capacitor 1148 and second resonant capacitor 1150 form a resonant tank circuit.

Figure 12:
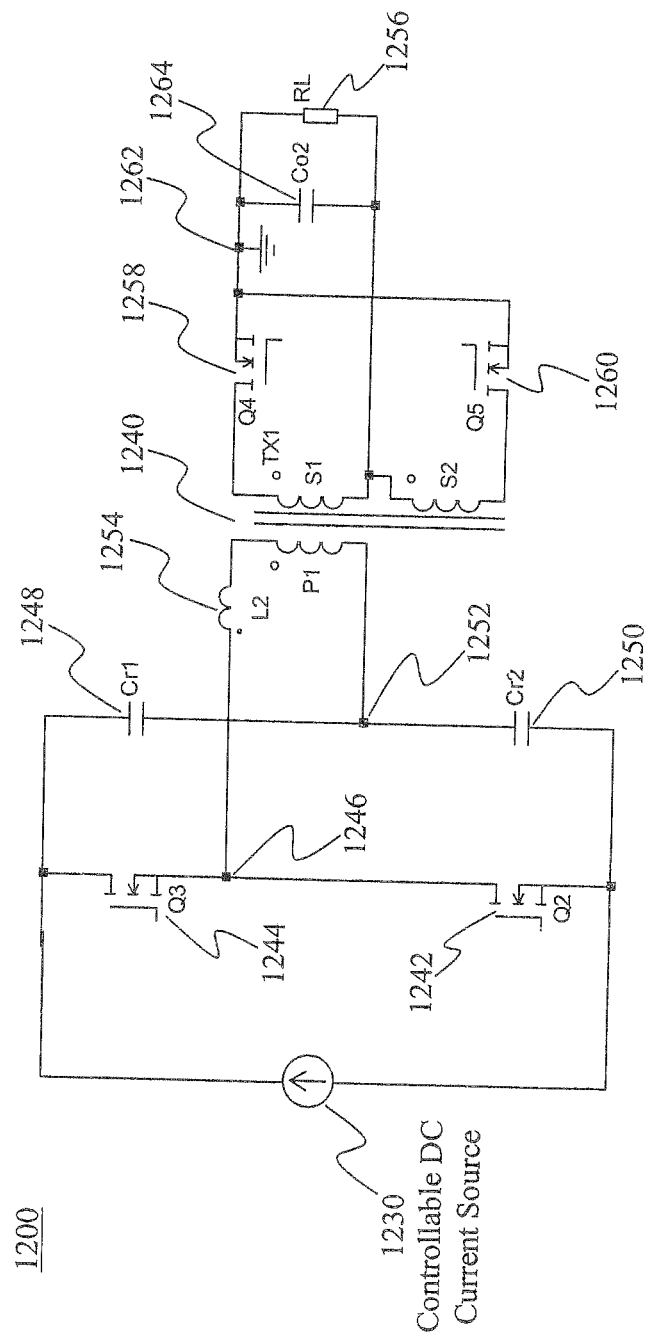
FIG. 12 is a schematic diagram of yet another embodiment of a two stage resonant converter employing a half-bridge converter in accordance with the principles of the present invention.

FIG. 12 is a schematic diagram of yet another embodiment of a two stage resonant converter 1200 employing a half-bridge converter in accordance with the principles of the present invention. The two stage resonant converter 1200 comprises a controllable DC current source 1230 and a transformer 1240. The transformer 1240 comprises a first primary winding P1, a first secondary winding S1, and a second secondary winding S2. A first primary switch 1242 is coupled between a first terminal of the first primary winding P1 and the controllable current source 1230. A second primary switch 1244 is coupled between the first terminal of the first primary winding P1 and the controllable current source 1230. The first primary switch 1242 and the second primary switch 1244 are coupled to the first terminal of the first primary winding P1 through a common node 1246.

In some embodiments, a first secondary switch 1258 is coupled between the first secondary winding S1 and the output of the isolated buck-type converter, and a second secondary switch 1260 is coupled between the second secondary winding S2 and the output of the isolated buck-type converter. In some embodiments, the output of the isolated buck-type converter is coupled to a load resistor 1256. In some embodiments, an output capacitor 1264 is coupled in parallel between the transformer 1240 and the output of the isolated buck-type converter. In some embodiments, a ground terminal 1262 is coupled between the transformer 1240 and the output of the isolated buck-type converter. In some embodiments, a primary inductor 1254 is coupled between the first terminal of the first primary winding P1 and the common node 1246 of the first primary switch 1242 and the second primary switch 1244. In some embodiments, a first resonant capacitor 1248 and a second resonant capacitor 1250 are coupled between the controllable DC current source 1230 and the transformer 1240. In some embodiments, first resonant capacitor 1248 and second resonant capacitor 1250 are coupled to the second terminal of the first primary winding P1 through a common node 1252. Together with the primary inductor 1254, first resonant capacitor 1248 and second resonant capacitor 1250 form a resonant tank circuit.

Figure 13:
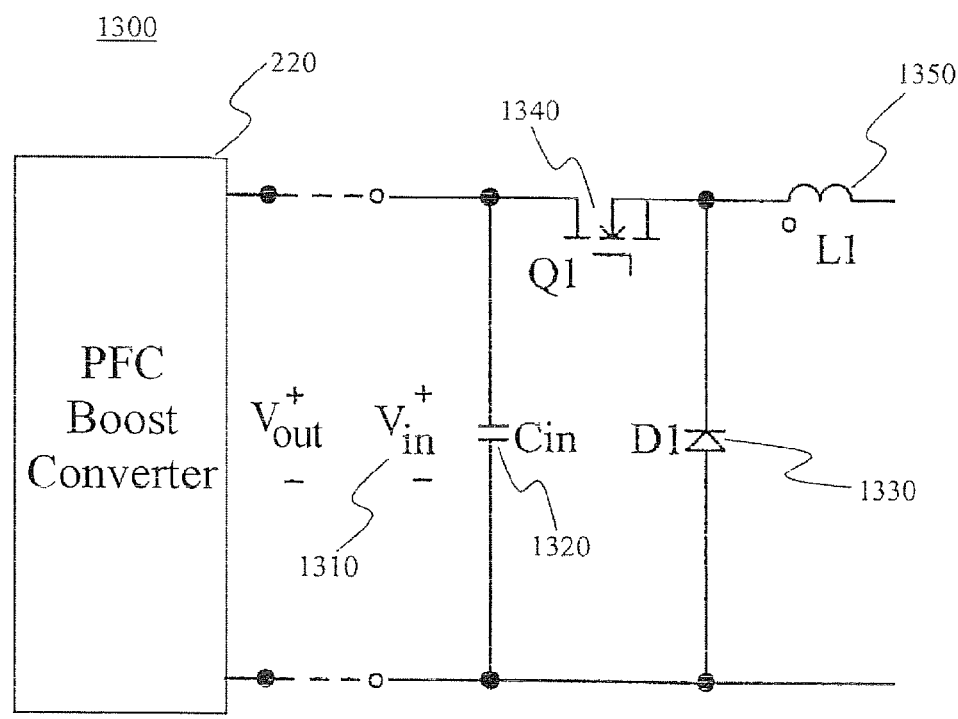
FIG. 13 is a schematic diagram of one embodiment of a controllable DC current source in accordance with the principles of the present invention.

FIG. 13 is a schematic diagram of one embodiment of a controllable DC current source 1300 in accordance with the principles of the present invention. The controllable DC current source 1300 comprises an input voltage supply 1310, an input capacitor 1320, a first stage diode 1330, a first stage switch 1340, and a first stage inductor 1350. Input capacitor 1320 is coupled in parallel with input voltage supply 1310, which generates an input supply voltage Vin, and with first stage diode 1330. In some embodiments, first stage switch 1340 is an N-channel MOSFET in enhancement mode. However, it is contemplated that other types of switches can be used as well. A first terminal (or drain) of first stage switch 1340 is coupled to the positive terminal of input voltage supply 1310 and a first terminal of input capacitor 1320. A third terminal (or source) of first stage switch 1340 is coupled to the cathode terminal of first stage diode 1330 and to a first terminal of first stage inductor 1350. A second terminal of input capacitor 1320 is coupled to the negative terminal of input voltage supply 1310 and to the anode terminal of first stage diode 1330. Additionally, the anode terminal of first stage diode 1330 is also coupled to the negative terminal of input voltage supply 1310. Controllable current source 1300 can be used for any of the controllable DC current sources previously shown and discussed with respect to FIGS. 2-3 and 5-12. Furthermore, it is contemplated that the present invention can employ alternative embodiments for the controllable current source other than the design illustrated in FIG. 13.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made and equivalents may be substituted for elements in the embodiments chosen for illustration without departing from the spirit and scope of the invention as defined by the claims.

What is claimed is:

1. A resonant converter comprising:
a controllable current source having a constant DC output current;
a resonant tank circuit coupled to the controllable current source and having a capacitor and one or more inductors; and
an isolated buck-type converter coupled to the resonant tank circuit and having a transformer and an output, wherein at least one of the inductors of the resonant tank circuit is directly coupled to the transformer and the output current of the controllable current source is coupled to the transformer, and further wherein the resonant tank circuit enables switches in the isolated buck-type converter to switch under soft-switching conditions.

2. The resonant converter of claim 1, wherein the controllable current source is a switch-mode-type current source that generates a constant output current utilizing a switching operation.

3. The resonant converter of claim 1, further comprising a power factor correction (PFC) boost converter coupled to an input of the controllable current source, wherein the PFC boost converter is configured to provide a voltage to the input of the controllable current source.

4. The resonant converter of claim 3, wherein:
the PFC boost converter is configured to provide a DC input voltage to the input of the controllable current source; and
the isolated buck-type converter is configured to provide a DC output voltage to the output of the isolated buck-type converter.

5. The resonant converter of claim 1, wherein the isolated buck-type converter comprises one of the group consisting of: a half-bridge converter, a full-bridge converter and a push-pull converter.

6. The resonant converter of claim 5, wherein the isolated buck-type converter comprises a push-pull converter, the push-pull converter comprising:
a transformer having a first primary winding, a second primary winding, a first secondary winding, and a second secondary winding, wherein the controllable current source is coupled to a node between the first and second primary windings to form a primary center tap;
a first primary switch coupled between the first primary winding and the controllable current source; and
a second primary switch coupled between the second primary winding and the controllable current source.

7. The resonant converter of claim 6, wherein the push-pull converter further comprises:
a first secondary diode coupled between the first secondary winding and the output of the isolated buck-type converter; and
a second secondary diode coupled between the second secondary winding and the output of the isolated buck-type converter.

8. The resonant converter of claim 6, wherein the push-pull converter further comprises:
a first primary inductor coupled between the first primary winding and the first primary switch; and
a second primary inductor coupled between the second primary winding and the second primary switch.

9. The resonant converter of claim 6, wherein the push-pull converter further comprises:
a first secondary inductor coupled between the first secondary winding and the output of the isolated buck-type converter; and
a second secondary inductor coupled between the second secondary winding and the output of the isolated buck-type converter.

10. The resonant converter of claim 6, wherein the push-pull converter further comprises:
a first secondary switch coupled between the first secondary winding and the output of the isolated buck-type converter; and
a second secondary switch coupled between the second secondary winding and the output of the isolated buck-type converter.

11. The resonant converter of claim 5, wherein the isolated buck-type converter comprises a full-bridge converter, the full-bridge converter comprising:
a transformer having a first primary winding, a first secondary winding, and a second secondary winding;
a first primary switch coupled between a first terminal of the first primary winding and the controllable current source;
a second primary switch coupled between a second terminal of the first primary winding and the controllable current source;
a third primary switch coupled between the first terminal of the first primary winding and the controllable current source, wherein the first primary switch and the third primary switch are coupled to the first terminal of the first primary winding through a first common node; and
a fourth primary switch coupled between the second terminal of the first primary winding and the controllable current source, wherein the second primary switch and the fourth primary switch are coupled to the second terminal of the first primary winding through a second common node.

12. The resonant converter of claim 11, wherein the full-bridge converter further comprises:
a first secondary diode coupled between the first secondary winding and the output of the isolated buck-type converter; and
a second secondary diode coupled between the second secondary winding and the output of the isolated buck-type converter.

13. The resonant converter of claim 11, wherein the full-bridge converter further comprises a primary inductor coupled between the first terminal of the first primary winding and the first common node of the first primary switch and the third primary switch.

14. The resonant converter of claim 11, wherein the full-bridge converter further comprises a secondary inductor coupled between a third common node between the first and second secondary windings and the output of the isolated buck-type converter.

15. The resonant converter of claim 11, wherein the full-bridge converter further comprises:
   a first secondary switch coupled between the first secondary winding and the output of the isolated buck-type converter; and
   a second secondary switch coupled between the second secondary winding and the output of the isolated buck-type converter.

16. The resonant converter of claim 5, wherein the isolated buck-type converter comprises a half-bridge converter, the half-bridge converter comprising:
   a transformer having a first primary winding, a first secondary winding, and a second secondary winding;
   a first primary switch coupled between a first terminal of the first primary winding and the controllable current source; and
   a second primary switch coupled between the first terminal of the first primary winding and the controllable current source, wherein the first primary switch and the second primary switch are coupled to the first terminal of the first primary winding through a common node.

17. The resonant converter of claim 16, wherein the half-bridge converter further comprises:
   a first secondary diode coupled between the first secondary winding and the output of the isolated buck-type converter; and
   a second secondary diode coupled between the second secondary winding and the output of the isolated buck-type converter.

18. The resonant converter of claim 16, wherein the half-bridge converter further comprises a primary inductor coupled between the first terminal of the first primary winding and the common node of the first primary switch and the second primary switch.

19. The resonant converter of claim 16, wherein the half-bridge converter further comprises a secondary inductor coupled between a common node between the first and second secondary windings and the output of the isolated buck-type converter.

20. The resonant converter of claim 16, wherein the half-bridge converter further comprises:
   a first secondary switch coupled between the first secondary winding and the output of the isolated buck-type converter; and
   a second secondary switch coupled between the second secondary winding and the output of the isolated buck-type converter.

21. A resonant converter comprising:
   a power factor correction (PFC) boost converter;
   a resonant tank circuit comprising a capacitor and an inductor;
   a controllable current source coupled between the PFC boost converter and the resonant tank circuit such that the controllable current source receives a DC voltage from the PFC boost converter and outputs a constant DC current to the resonant tank circuit; and
   an isolated buck-type converter coupled to the output of the resonant tank circuit.

22. A resonant converter comprising:
   a controllable current source that outputs a constant DC current;
   a resonant tank circuit comprising a capacitor and an inductor and coupled to the output of the controllable current source; and
   an isolated buck-type converter directly coupled to the output of the resonant tank circuit, wherein the resonant tank circuit is not coupled to the isolated buck-type converter by a linking capacitor, and further wherein the resonant tank circuit enables switches in the isolated buck-type converter to switch under soft-switching conditions.

23. A resonant converter comprising:
   a power factor correction (PFC) boost converter;
   a switch-mode-type controllable current source coupled to a DC output of the PFC boost converter and including a switch, a diode, a capacitor and an inductor, wherein the switch-mode-type controllable current source generates a constant output current based on the DC output utilizing a switching operation;
   a resonant tank circuit comprising a capacitor and an inductor and coupled to the switch-mode-type controllable current source; and
   an isolated buck-type converter coupled to the resonant tank circuit, the isolated buck-type converter having an output, wherein the resonant tank circuit enables switches in the isolated buck-type converter to switch under soft-switching conditions.

* * * * *